United States Patent
Simon (10) Patent No.: US 10,150,485 B2
(45) Date of Patent: Dec. 11, 2018

(54) METHOD AND DEVICE FOR PROCESSING IMAGE DATA, AND DRIVER-ASSISTANCE SYSTEM FOR A VEHICLE

(71) Applicant: Robert Bosch GmbH, Stuttgart (DE)

(72) Inventor: Stephan Simon, Sibbesse (DE)

(73) Assignee: ROBERT BOSCH GMBH, Stuttgart (DE)

( * ) Notice: Subject to any disclaimer, the term of this patent is extended or adjusted under 35 U.S.C. 154(b) by 33 days.

(21) Appl. No.: 15/487,162

(22) Filed: Apr. 13, 2017

(65) Prior Publication Data

US 2017/0327127 A1  Nov. 16, 2017

(30) Foreign Application Priority Data

May 11, 2016  (DE) .................. 10 2016 208 056

(51) Int. Cl.
| | |
|---|---|
| *G06K 9/00* | (2006.01) |
| *B60W 50/14* | (2012.01) |
| *G06T 7/50* | (2017.01) |
| *G06T 7/20* | (2017.01) |
| *G06T 19/20* | (2011.01) |
| *H04N 7/18* | (2006.01) |
| *G06T 7/579* | (2017.01) |
| *G01S 5/16* | (2006.01) |
| *G01S 19/13* | (2010.01) |

(52) U.S. Cl.
CPC ............ *B60W 50/14* (2013.01); *G01S 5/16* (2013.01); *G06T 7/20* (2013.01); *G06T 7/50* (2017.01); *G06T 7/579* (2017.01); *G06T 19/20* (2013.01); *H04N 7/183* (2013.01); *B60W 2420/403* (2013.01); *G01S 19/13* (2013.01); *G06T 2207/10016* (2013.01); *G06T 2207/30252* (2013.01)

(58) Field of Classification Search
USPC ........................................................ 382/104
See application file for complete search history.

(56) References Cited

U.S. PATENT DOCUMENTS

| | | | |
|---|---|---|---|
| 8,644,697 B1 | 2/2014 | Tzur et al. | |
| 2011/0096832 A1 | 4/2011 | Zhang et al. | |
| 2015/0279083 A1 | 10/2015 | Pradeep et al. | |
| 2016/0267350 A1* | 9/2016 | Oki | G06K 9/6201 |
| 2017/0314927 A1* | 11/2017 | Royster | G01C 21/005 |
| 2017/0343655 A1* | 11/2017 | Solek | G01S 7/52022 |
| 2018/0150949 A1* | 5/2018 | Matono | G06T 5/50 |

FOREIGN PATENT DOCUMENTS

| | | |
|---|---|---|
| WO | 2015158570 A1 | 10/2015 |
| WO | 2015173173 A1 | 11/2015 |

* cited by examiner

*Primary Examiner* — Jerome Grant, II
(74) *Attorney, Agent, or Firm* — Norton Rose Fulbright US LLP; Gerard Messina (57) ABSTRACT

A method for processing image data. The method includes a step of determining correspondence data as the result of a correspondence generation between first image data that represent data recorded by a camera at a first point in time, and preceding image data that represent data recorded by the camera at a preceding point in time. In a step of determining, depth data are determined on the basis of an ego-motion estimate carried out using the correspondence data. In a step of ascertaining, fusion data are ascertained using the depth data and the transferred fusion data, the fusion data including an item of depth information based on the image data.

12 Claims, 4 Drawing Sheets

METHOD AND DEVICE FOR PROCESSING IMAGE DATA, AND DRIVER-ASSISTANCE SYSTEM FOR A VEHICLE

CROSS REFERENCE

The present application claims the benefit under 35 U.S.C. § 119 of German Patent Application No. DE 102016208056.3 filed on May 11, 2016, which is expressly incorporated herein by reference in its entirety.

BACKGROUND INFORMATION

Driver-assistance systems of vehicles are able to utilize data recorded by cameras. To do so, the data may be preprocessed, for example compressed, prior to being used by the driver-assistance systems.

SUMMARY

In accordance with the present invention, a method for processing image data, as well as a device which uses the method, a driver-assistance system and finally, a corresponding computer program are provided. The measures described herein allow for advantageous further developments and improvements of the present invention.

The present invention, for example, may be employed in connection with camera-based driver-assistance systems or in connection with other systems having cameras, such as mobile robots.

A camera-based acquisition of information is typically characterized by rapid compacting of the information. The original measuring signal may be a flow field (optical flow map), for example, or a disparity map (stereo disparity map). The compacting, for example, results in stixels (column-wise pixel groups) or object boxes (bounding box). Tracking and possibly fusion then take place at a higher level.

The early compaction has historical and architectural grounds. For example, the optical flow is able to be calculated with a manageable resource expenditure on an FPGA or ASIC and produces a dense result field (high data quantity per image).

The further analysis and processing constitutes the bottleneck, in particular when it is executed on a general-purpose processor. An enormous share of information is lost in the necessary compaction.

This early compacting of information also hampers the development of new functions because the architecture is optimized for the existing functions.

A so-called "occupancy grid" suitable for assisting in a fusion of multiple measurements, which may also come from a plurality of sensors, may be employed. For instance, this is frequently used in the robotics field, for example for path planning purposes. The coordinate system frequently corresponds to that of a map (bird's eye perspective).

In "3D point clouds", an individual 3D point of this type represents a 3D measurement of a world point, for which measurement uncertainties may also be indicated, if warranted. Surfaces are frequently represented by interpolation on the basis of point clouds. In embedded systems, such point clouds can in most cases represent the real 3D world only very sparsely for cost-related reasons because the management and utilization of large point clouds places great demands on the computer platform.

An example embodiment of the present invention described herein may function without occupancy grid and 3D point clouds and instead uses a special fusion on the pixel grid, by which high data densities are able to be managed in an efficient manner even in cost-effective embedded systems.

A method for processing image data encompasses the following steps:

Determining correspondence data as the result of a correspondence generation between first image data that represent data based on image data recorded by a camera at a first point in time, and preceding image data that represent data based on image data recorded by the camera at a preceding point in time;

Determining depth data on the basis of an ego-motion estimate performed with the aid the correspondence data; and Ascertaining fusion data using the depth data and the transferred fusion data, the fusion data encompassing an item of depth information based on the image data.

The image data to be processed may be image data made available by at least one camera. A camera can be understood as an image-recording device which is able to supply image data that represent an environment of the image-recording device at successive points in time. The first image data as well as the preceding image data may be data as provided directly by a camera, or data that has already been conditioned. The preceding point in time may lie temporally before the first point in time. The preceding image data may thus be stored image data. The correspondence generation may encompass a correspondence analysis. The correspondence data may include an item of information regarding features that correspond to one another such as mutually corresponding image points, also known as pixels, in the first image data and the preceding image data. The correspondence data may include information as to how positions of corresponding image points in the first image data and the preceding image data have shifted in relation to one another. By performing the ego-motion estimate, a spatial structure of an object represented in the image data is able to be identified in the image data based on corresponding features. The information about the corresponding features required for this purpose may be included in the correspondence data. The depth data is able to represent a depth image. The depth data may be determined in two steps. First, the ego-motion may be determined, i.e., the own movement. This does not require all of the correspondence data but merely a small selection. Next, the depth data is determined for all pixels for which correspondence data are available. In the application case of a mono-camera, an ego-motion estimate may be carried out in order to determine the depth data. The ego-motion estimate can be understood as the determination of the relative orientation of the two camera positions (six parameters, of which five are able to be determined, i.e., everything except for scale) in a moving monocular camera. In case of a stereo camera and a rigid stereo system, the relative orientation and the scale are usually known. If nevertheless the relative orientation is to be estimated, then an online calibration may be carried out instead of an ego-motion estimate. As soon as the relative orientation and the camera distance are known, the discovered correspondences may be converted into depths by way of triangulation.

The quality of the depth data is able to be improved because of the fusion with the transferred fusion data. The fusion, for example, may encompass a mean value generation. Thus, the depth information may represent a depth image.

According to a specific embodiment, a fusion of depth measurements in the pixel grid is carried out with the aid of the method using the optical flow.

This allows for a high range of the image recording through a seamless consideration or fusion of additional flow fields featuring a greater time interval. The interval, for example, may amount to 2T, 4T or 8T, and T may represent a time step. Furthermore, high accuracy is made possible in all distance ranges by reducing the measurement uncertainty. If two cameras are used, a seamless transition of the system behavior from stereo to mono is implementable in addition, e.g., if one of the two cameras experiences interference or is no longer available. In the case of video-based driver-assistance systems, only a low development investment is required because different camera system developments (such as a monocular system, stereo system, multi-camera system) may adopt the unified concept described here as the basis of the basic signal processing.

According to a specific embodiment, the described approach is based on an enrichment of information on the pixel grid. Here, the quality and accuracy of the measurement are improved considerably (in comparison with the individual measurements). The enrichment takes place regardless of the subsequent compacting and may be implemented massively parallel, e.g., on an FPGA or ASIC platform.

For this purpose, a fusion, which combines an old and one or more new image(s) of measuring results in a weighted manner, takes place at predefined or at variable times. For example, a fusion may be undertaken in each time step. However, the fusion need not necessarily be carried out after each fixed time section T. The time interval may certainly also be irregular, e.g., 2T, if a flow field is missing in between (for instance because the computing unit was busy with some other task), or even 1.2739T and 0.9864T the next time. According to a specific embodiment, the cameras may also not be running on a fixed time basis but be triggered or read out after a fixed driven distance, for example. Thus, the fusion may also take place at points in time that are independent of a time basis. In the exemplary embodiments described hereinafter, a fixed time interval T is assumed for the most part, simply for the sake of simplification.

Optical flows to one or more preceding image(s) as well as, optionally, stereo disparities (likewise preferably dense) are supported, for one, and both monocular camera systems and stereo or even multi-camera systems are supported, for another. The optical flows may be dense, i.e. be present for each pixel, if possible. However, the optical flows may advantageously be only regionally dense rather than completely dense. For example, it is not necessary and also not really possible to determine the optical flow on the blue sky. Only if sufficient texture is present is it possible to determine the optical flow in a meaningful way. The flow may be dispensed with in the absence of sufficient texture. The stereo disparities may likewise be fully or regionally dense.

According to a specific embodiment, said method includes a step of determining the transferred fusion data as the result of a transfer of fusion data, ascertained in a preceding step of ascertaining, and the correspondence data. The transfer makes it possible to take a movement into account that has occurred since the preceding step, so that the transferred fusion data are able to be fused directly with the depth data in the step of ascertaining.

In the step of determining the correspondence data, flow vectors are able to be ascertained as the correspondence data. The flow vectors may be allocated to image points of the first image data and additionally or alternatively, to image points of the preceding image data. The correspondences usually provide sub-pixel accuracy, that is to say, they do not point exactly from image-point center to image-point center, but lie in the grid in an off-centered manner in at least one of the two images. In general, whole-pixel motions are also permitted. Thus, there may also be correspondences that point exactly from image-point center to image-point center. Known methods may advantageously be utilized for determining flow vectors.

In the step of determining depth data, depth values may be determined as the depth data. The depth values may be allocated to image points of the first image data and additionally or alternatively, to image points of the preceding image data. Depth values represent important information that may be used for applications in the field of driver-assistance systems or mobile robots, for example.

For instance, the fusion data are able to be ascertained in the step of ascertaining using a mean value generation between the depth data and the transferred fusion data. Such a mean value generation is able to be carried out by simple means.

In the event that no transferred fusion data are available, the fusion data ascertained in the step of ascertaining may correspond to the depth data. This is useful in an initialization of the system, for example.

If no depth data are available, then the fusion data may correspond to the transferred fusion data. This is useful, for example, if new image data are no longer provided.

In the step of ascertaining the fusion data, a consistency between the depth data and the transferred fusion data may be checked. Depending on the result of the consistency check, the fusion between the depth data and the transferred fusion data may be carried out or suspended. This makes it possible to avoid a falsification if an inconsistency is present between the data to be fused.

The method is able to be expanded by determining additional correspondence data, e.g., with the aid of the first image data and image data recorded at additional preceding points in time; these further correspondence data may be used to determine further depth data, which then are able to be fused with the initially mentioned depth data and the transferred fusion data, in order to determine the fusion data. This allows for a further increase in the accuracy and quality of the fusion data.

Thus, the method may encompass at least one step of determining additional correspondence data as the result of a correspondence generation between the first image data and further preceding image data that represent data based on image data recorded by the camera at a further preceding point in time. Accordingly, the method may include at least a step of determining additional depth data on the basis of an ego-motion estimate carried out using the additional correspondence data. In the step of ascertaining, the fusion data may furthermore be ascertained using the additional depth data.

According to a specific embodiment, the method may include a step of determining stereo correspondence data as the result of a correspondence generation between the first image data and the second image data. The second image data may represent data based on image data recorded by another camera at the first point in time. In a step of determining, stereo depth data that represent depth data and/or a scale are able to be ascertained on the basis of a triangulation carried out with the aid of the stereo correspondence data. The scale makes it possible to represent a traveled distance. In the step of ascertaining, the fusion data may additionally be ascertained with the aid of the stereo depth data and/or the scale. This allows the image data from another camera such as a stereo camera system to be incorporated in the ascertainment of the fusion data. According to a specific embodiment, the scale is understood as a conversion factor that allows the depth data to be converted from a 1/s (TTC) unit into a metric distance, for example. A monocular system is unable to determine this scale by itself. An example: In a video sequence recorded from a moving locomotive, it is not possible to determine based on the movement in the image whether it involves a locomotive of a model train or a real locomotive. Only if scale information is provided from the outside, e.g., a traveled distance in meters between two image recordings or the height of the camera above the rails, will it be possible to indicate metrical depth data. The scale may also come from a stereo camera whose distance is known (basic width).

For example, the method may encompass a step of acquiring the image data with the aid of at least one camera. In addition or as an alternative, the method may include a step of using the fusion data in a driver-assistance system for a vehicle or in a control device for a mobile robot. This allows the method to be incorporated into an overall system.

For example, this method may be implemented in software or hardware or in a mixed form of software and hardware, for instance in a control device.

In accordance with the present invention, a device is additionally provided which is designed to execute, trigger or implement the steps of a variant of a method introduced here in corresponding devices. This specific embodiment variant of the present invention in the form of a device is also able to achieve the objective on which the present invention is based in a rapid and efficient manner.

For this purpose, the device may include at least one computing unit for processing signals or data, at least one memory unit for storing signals or data, at least one interface to a sensor or an actuator for reading in sensor signals from the sensor or for outputting data or control signals to the actuator, and/or at least one communications interface for reading in or outputting data, which are embedded in a communications protocol. For example, the computing unit may be a signal processor, a microcontroller or the like, and the memory unit may be a flash memory, an EPROM, or a magnetic memory unit. The communications interface may be designed to read in or output data wirelessly and/or in a line-bound manner; a communications interface which is able to read in line-bound data or output data may read in these data, for instance electrically or optically, from a corresponding data-transmission line, or output them onto a corresponding data-transmission line.

A corresponding device for processing image data has the following features:

A determination device, which is designed to determine correspondence data as the result of a correspondence generation between first image data that represent data based on image data recorded by a camera at a first point in time, and of preceding image data that represent data based on image data recorded by the camera at a preceding point in time;

A determination device, which is designed to determine depth data on the basis of an ego-motion estimate performed using the correspondence data; and An ascertainment device, which is designed to ascertain [sic] using the depth data and the transferred fusion data, the fusion data including an item of depth information based on the image data.

A vehicle includes at least one camera, said device for processing the image data of the at least one camera, and a driver-assistance system. The driver-assistance system is designed to execute a driver-assistance function using fusion data provided by the device.

For the application case of a mobile robot, the mobile robot may also include a camera and said device. In this case, the fusion data may be used by a device for controlling a function or movement of the robot, for instance.

Also advantageous is a computer program product or a computer program having program code, which may be stored on a machine-readable carrier or memory medium such as a semiconductor memory, a hard disk memory or an optical memory, and which is used for executing, implementing and/or actuating the steps of the present method as recited in one of the aforementioned specific embodiments, in particular when the program product or the program is executed on a computer or on a device.

Exemplary embodiments of the present invention described here are shown in the figures and explained in greater detail below.

DETAILED DESCRIPTION OF EXAMPLE EMBODIMENTS

In the following description of advantageous exemplary embodiments of the present invention, the same or similar reference numerals are used for the elements that are shown in the figures and have a similar effect, and a repeated description of these elements has been dispensed with.

Figure 1:
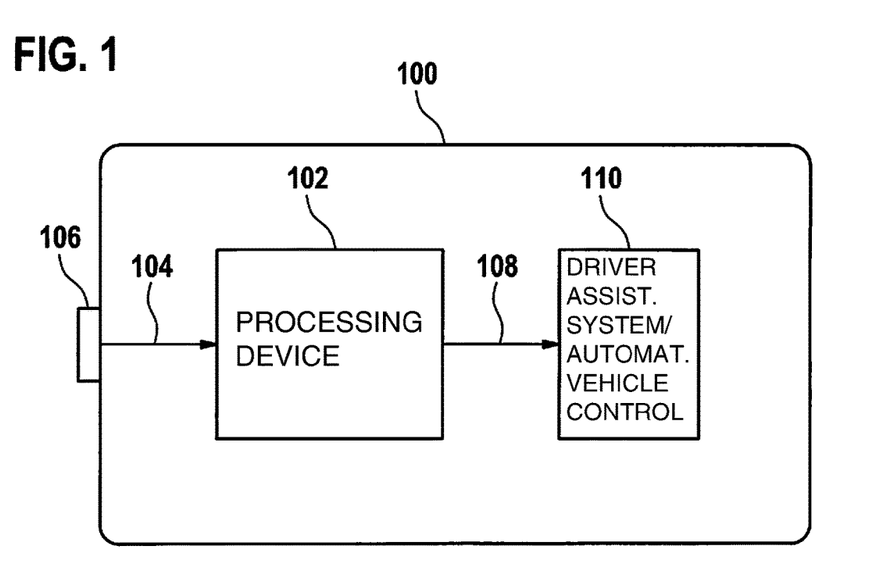
FIG. 1 a schematic representation of a vehicle having a device for processing image data according to an exemplary embodiment.

FIG. 1 shows a vehicle 100 having a device 102 for processing image data 104 of a camera 106 of vehicle 100 according to an exemplary embodiment. Device 102 is designed to receive image data 104 from camera 106 via an interface and to generate and provide fusion data 108 using image data 104. According to a specific embodiment, fusion data 108 represent a depth image that was ascertained with the aid of image data 104 recorded by camera 106 at different points in time.

Device 102 is designed to provide fusion data 108 via another interface to an additional device 110 of vehicle 100, for instance to a driver-assistance system 110 of vehicle 100.

For example, fusion data 108 may be used by driver-assistance system 110 for solving a driving task of vehicle 100.

According to an alternative exemplary embodiment, FIG. 1 shows a mobile robot 100. In this case, fusion data 108, provided by device 102, may be used by a control unit 110 of robot 100 for executing a function of mobile robot 100. Mobile robot 100 may also be a highly automated vehicle.

If more than one camera 106 is available, device 102 may be developed to use image data 104 from the plurality of cameras 106 for determining fusion data 108.

Figure 2:
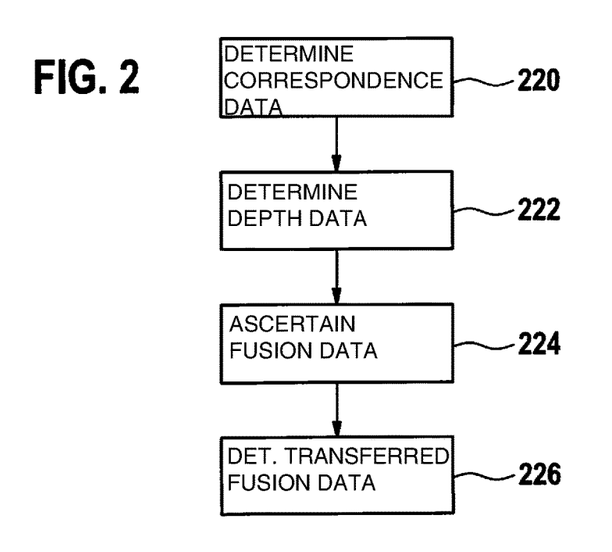
FIG. 2 a flow diagram of a method for processing image data according to an exemplary embodiment.

FIG. 2 shows a flow diagram of a method for processing image data according to an exemplary embodiment. For instance, the method may be executed using the device for processing image data described on the basis of FIG. 1.

In a step 220, correspondence data are determined as the result of a correspondence generation between first image data and preceding image data. The first image data are based on image data recorded by a camera at a first point in time. The preceding image data are based on image data recorded by the camera at a preceding point in time. According to an exemplary embodiment, flow vectors are determined as the correspondence data. The flow vectors may be allocated to the image points of the first image data. In addition or as an alternative, the flow vectors may be allocated to image points of the preceding image data.

In a step 222, depth data are determined on the basis of the correspondence data. To do so, an ego-motion estimate is carried out using the correspondence data. In the process, depth values are able to be determined as the depth data. The depth values determined in this way may be allocated to the image points of the first image data and/or to the image points of the preceding image data.

In a step 224, fusion data are ascertained using the depth data and the transferred fusion data. The fusion data are ascertained by fusing the depth data and the transferred fusion data.

In an optional step 226, the transferred fusion data are determined from the fusion data determined in a preceding step of ascertaining and from the correspondence data.

Steps 220, 222, 224, 226 may be executed repeatedly on a continuous basis. In this way, the first image data, for instance, may correspond to the preceding image data in a subsequent pass-through.

According to an exemplary embodiment, in step 220, a flow vector is determined for each image point or for a number of image points of the first image data and/or the preceding image data. It is not necessary to be able to provide a flow vector for each image point here, which means that "gaps" may be present. The correspondence data thus include a respective flow vector for each image point, or at least for a number of image points, of the first image data and/or the preceding image data.

According to an exemplary embodiment, in step 222, a depth value is determined for each image point of the first image data and/or the preceding image data. The depth data thus include a respective depth value for each image point of the first image data and/or the preceding image data.

According to an exemplary embodiment, in step 224, a depth value is determined for each image point of the first image data and/or the preceding image data. As a result, the fusion data include a respective depth value for each image point of the first image data and/or the preceding image data.

According to an exemplary embodiment, in step 226, the coordinates for each image point of read-in fusion data are transferred to the coordinates of subsequent image data, e.g., the first image data.

Figure 3:
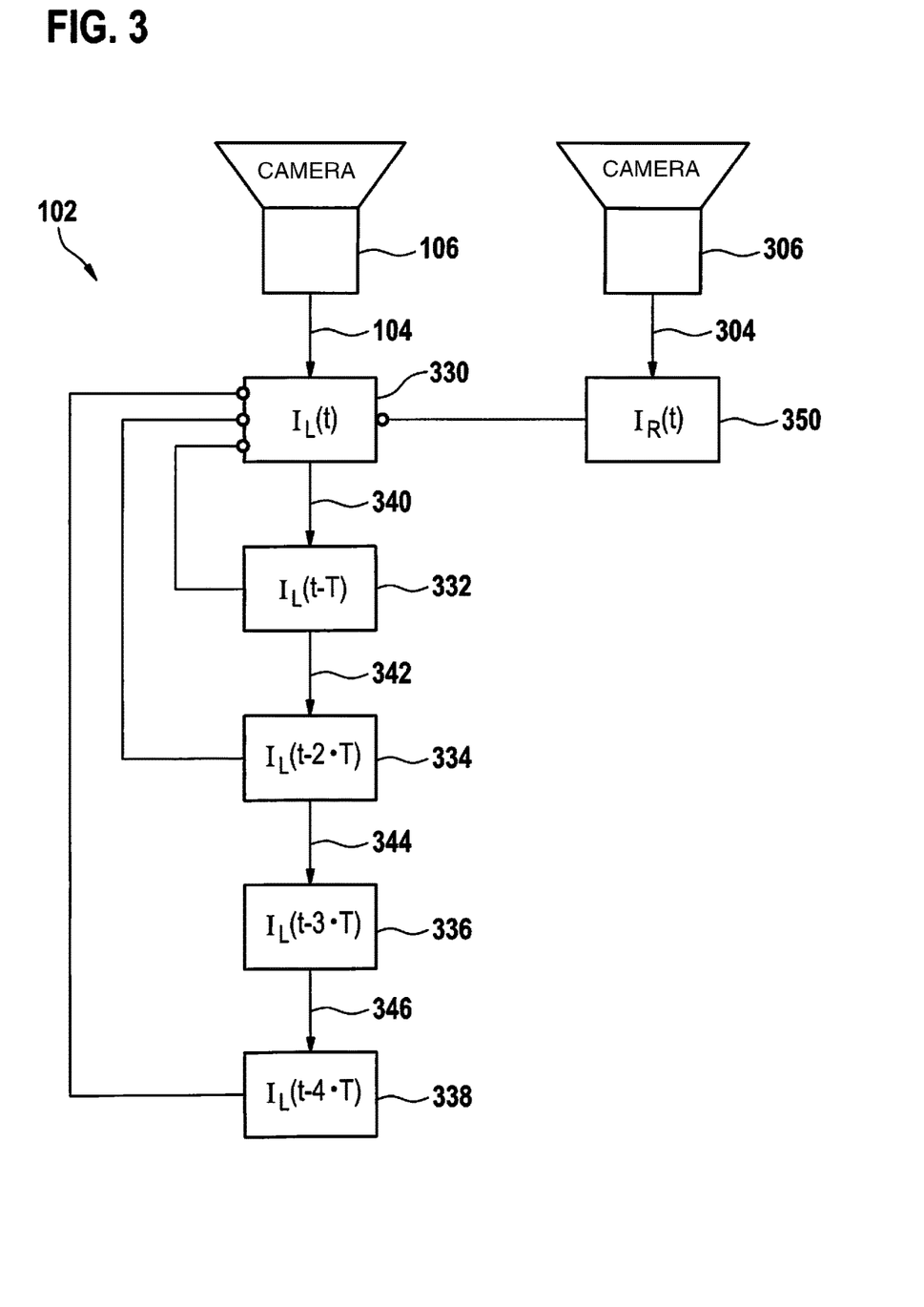
FIG. 3 a block diagram of a device for processing image data according to an exemplary embodiment.

FIG. 3 shows a block diagram of a device 102 for processing image data according to an exemplary embodiment. This may be an exemplary embodiment of the device described with the aid of FIG. 1.

According to this exemplary embodiment, a first camera 106 for supplying image data 104 and a second camera 306 for supplying image data 304 are provided. According to this exemplary embodiment, device 102 is developed to receive and process image data 104, 304 of cameras 106, 306 via a suitable interface.

Device 102 has a plurality of memory devices 330, 332, 334, 336, 338, in which image data 104 of camera 106, which were recorded at different points in time, are stored.

The number of memory devices 330, 332, 334, 336, 338 has here been selected merely by way of example. According to this exemplary embodiment, the time period T lies between temporally consecutive points in time by way of example. As an alternative, a different predefined or variable time period may lie between temporally consecutive points in time.

Stored in memory device 330 as first image data 340 are image data 104, currently or most recently made available by first camera 106. First image data 340 are also denoted by $I_L(t)$ according to this exemplary embodiment.

Stored in memory device 332 as first preceding image data 342 are image data 104, made available by camera 106 at a first preceding point in time. First preceding image data 342 are also denoted by $I_L(t-T)$ according to this exemplary embodiment.

Stored in memory device 334 as second preceding image data 344 are image data 104, which were made available by camera 106 at a second preceding point in time. Second preceding image data 344 are also denoted by $I_L(t-2T)$ according to this exemplary embodiment.

Stored in memory device 336 as third preceding image data 346 are image data 104, which were made available by camera 106 at a third preceding point in time. Third preceding image data 346 are also denoted by $I_L(t-3T)$ according to this exemplary embodiment.

Stored in memory device 338 as fourth preceding image data are image data 104, which were made available by camera 106 at a fourth preceding point in time. The fourth preceding image data are also denoted by $I_L(t-4T)$ according to this exemplary embodiment.

After a current time step has elapsed, first image data 340 are forwarded to memory device 332, first preceding image data 342 are forwarded to memory device 334, second preceding image data 344 are forwarded to memory device 336, and third preceding image data 346 are forwarded to memory device 338.

In addition, device 102 has another memory device 350, which is designed to store image data 304, currently or most recently made available by second camera 306, as second image data.

According to an exemplary embodiment, cameras 106, 306 are a left camera 106 and a right camera 306. Shown are different old image data 340, 342, 344, 346 as well as connections between which calculations for the correspondence generation take place.

FIG. 3 shows a more general exemplary embodiment. Important details will be explained later on the basis of the less complex example shown in FIG. 4, and finally, the more general example is explained in greater detail with the aid of FIG. 5.

The system shown in FIG. 3 includes two cameras 106, 306. Here, this system may be a stereo driver-assistance system having a left camera 106 and a right camera 306, for instance, which are pointing in the forward direction of a vehicle. Cameras 106, 306 supply a respective current image 104, 304, also referred to as $I_L(t)$ and $I_R(t)$, t representing the current point in time (newest image). Images $I_L(t-n \cdot T)$, with n=1, 2, 3, . . . , stem from earlier points in time and were stored in a memory 330, 332, 334, 336, 338. Instead of storing original images as image data 340, 342, 344, 346, it is also possible to store image data (feature images) that were processed further as image data 340, 342, 344, 346.

In this particular exemplary embodiment, no old images are stored from right camera 306.

The arrows (with arrow points) in the block diagram represent connections through which data 340, 342, 344, 346 are transported or held in readiness in the memory, e.g., in a ring buffer memory.

In addition, four connections are plotted in FIG. 3, which end on a side having a circle in each case. A correspondence analysis is performed on each one of these "connections". The correspondence analysis on the three connections between images of left camera 106 from different times pertains to a respective optical flow algorithm (optical flow). The results are respective flow vectors per pixel.

The circle indicates for which image the results are to be available. Here, all circles are located on the current left image, which is represented by first image data 340. This means that a search takes place to determine for each pixel in this image from where it originates in the respective preceding image. The search for the correspondence thus takes place in the backward direction (backward flow).

The fourth connection with a circle exists between the current left camera image, which is represented by first image data 340, and the right camera image, which is represented by second image data 350. Here, too, it is searched for the result in reference to the current left image. So-called stereo correspondences between a camera pair, which here consists of cameras 106, 306, are generated on this fourth connection. The result here is a disparity vector per pixel. In a calibrated stereo system, the second component of the disparity vector is zero and may be ignored, so that a one-dimensional disparity value remains per pixel.

Figure 4:
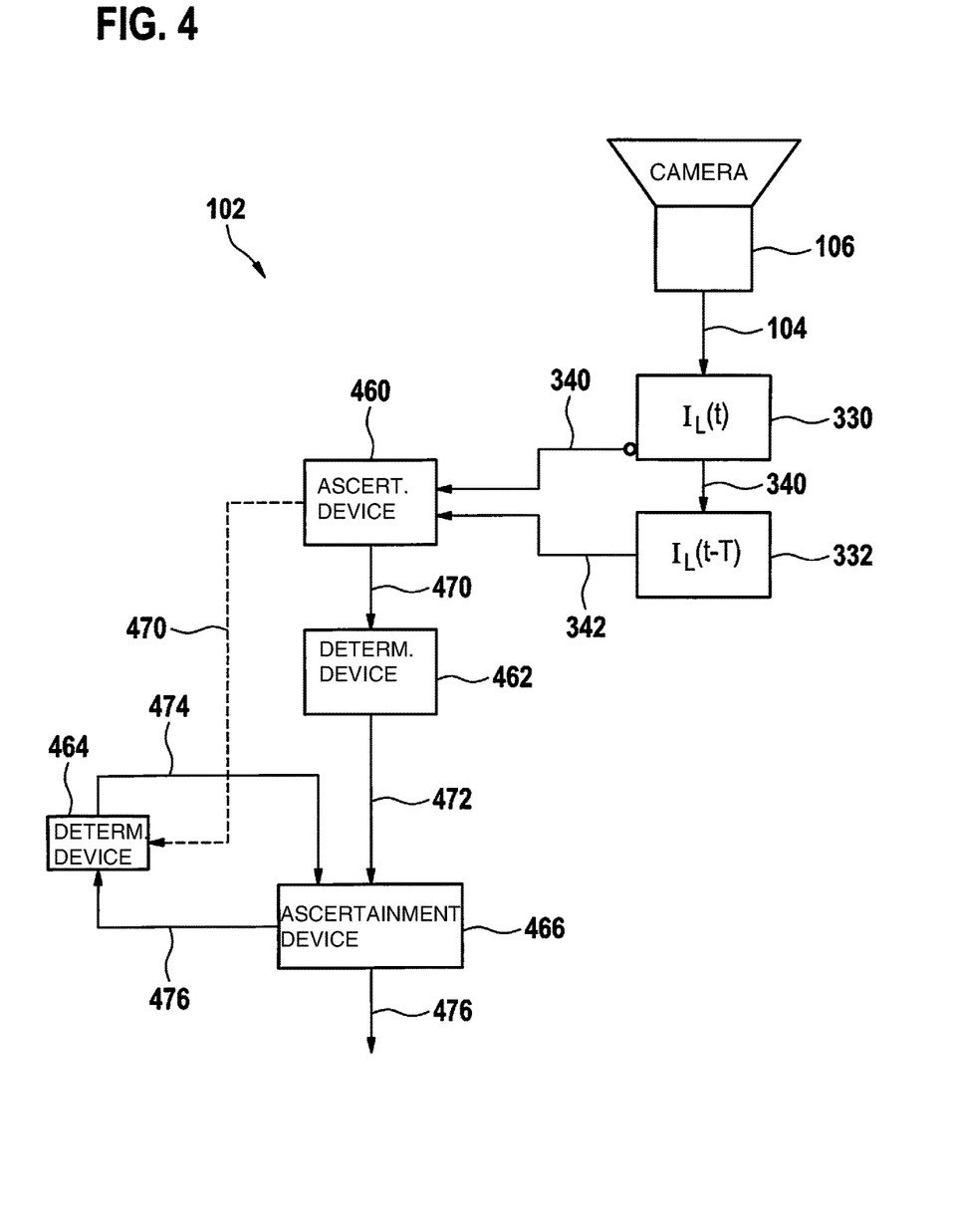
FIG. 4 a block diagram of a device for processing image data according to an exemplary embodiment.

FIG. 4 shows a block diagram of a device 102 for processing image data 104 according to an exemplary embodiment. This may be an exemplary embodiment of the device described with the aid of FIG. 1.

As already described on the basis of FIG. 3, device 102 includes a memory device 330 for storing first image data 340, which represent image data 104 currently or most recently provided by single camera 106. First image data 340 are once again denoted by $I_L(t)$. Furthermore, device 102 includes memory device 332, already described with the aid of FIG. 3, for storing preceding image data 342 that represent image data 104 made available by camera 106 at a preceding point in time. Preceding image data 342 once again are denoted by $I_L(t-T)$.

According to this exemplary embodiment, device 102 furthermore includes two determination devices 460, 462, 464 and an ascertainment device 466. Ascertainment device 460 is designed to generate a correspondence between first image data 340 and preceding image data 342, and to supply correspondence data 470 that were determined by such a correspondence generation. Determination device 462 is designed to carry out an ego-motion estimate using correspondence data 470, and to provide depth data 472 on the basis of the ego-motion estimate. Ascertainment device 466 is developed to ascertain and supply fusion data 476 using depth data 472 and transferred fusion data 474. According to this exemplary embodiment, transferred fusion data 474 are provided by determination device 464. Determination device 464 is designed to ascertain transferred fusion data 474 using fusion data 474 provided by ascertainment device 466 and correspondence data 470 provided by ascertainment device 460.

In FIG. 4, a simplified block diagram of device 102 is thus shown, in which only left camera 106 is considered, which was already described with the aid of FIG. 3. Correspondences (Corresp) represented by correspondence data 470 are calculated between the new camera image represented by the first image data 340 and the preceding camera image represented by preceding image data 342. Based on these correspondences and using determination device 462, the ego-motion and depth are calculated (EM&D). The result, in the form of depth data 472, is fused with earlier results, which are first warped into the pixel grid of the current image. Determination device 464 is utilized for this purpose.

In order to explain further details, a simpler exemplary embodiment, which is shown in FIG. 4 and which may also be considered a cut-away from the example illustrated with the aid of FIG. 3, is examined to begin with.

Determination device 460, also denoted by "Corresp", here relates to the correspondence generation, in which the (possibly preprocessed) image data 340 h(t) and 342 h(t−T) are considered via the double arrow.

An ego-motion estimate is subsequently carried out, and a depth is determined for each pixel in determination device 462, also referred to as "EM&D" (ego-motion & depth). According to an exemplary embodiment, what is known as a "structure from motion" method is used for this purpose.

In case of a monocular camera 106, it is known that of the six parameters of the ego-motion (three angles of rotation and a three-dimensional translation vector), only five parameters are able to be determined (three angles of rotation and the direction of the translation), which means that the scale (distance traveled) remains initially unknown or may optionally be obtained from some other source such as a GPS receiver or from wheel sensors (odometry).

However, it is also possible and uncomplicated to carry out the further processing despite the initially unknown scale. For this purpose, the intermediate results, referred to as "depth", are preferably expressed as TTC per pixel or as reciprocal value 1/TTC per pixel. TTC (time to collision) represents a time such as the time that elapses given an unchanged relative movement between the camera and the scene until the monitored world point passes through the imaginary plane running through the projection center of camera 106 and standing perpendicular to its main axis (optical axis).

For numerical reasons, the inverse value 1/TTC is also often used instead of TTC. The unit of TCC may be indicated in seconds, for example, or by the number of camera images (frames).

In the following text, the term "depth" is used in a general sense. It may denote a spatial distance or a time difference or some arbitrary non-linear function (e.g., the inverse value) of one of the two quantities.

Up to this point, the employed terminology and methods are known to one skilled in the art. Hereinafter, a main point of the approach described here will be elucidated in greater detail. This pertains generally to the blocks in the block diagram shown in FIG. 4, which relate to determination device 464 and ascertainment device 466.

To begin with, a first variant of a fusion in the pixel grid will be described in this context.

According to this exemplary embodiment, ascertainment device 466 is designed to execute a fusion algorithm, also referred to as "fusion".

That is to say, "depth images" with the described content per pixel represented by depth data 472 are made available to the fusion algorithm.

An item of information about the measurement uncertainty per pixel is optionally also supplied for each pixel. It may be available as an image or as a calculation rule. The calculation rule requires less memory space and less transmission bandwidth. For example, the measurement uncertainty may be indicated in the form of a standard deviation with regard to the respective depth value.

The first variant of the fusion in the pixel grid described here and carried out in ascertainment device 466 is characterized by the fact that the depths represented by depth data 472 are calculated in advance in determination device 460 in such a way that the depth image represented by image data 472 is present in the coordinates of the older of the two images that are represented by image data 340, 342.

This means that the depth value of a pixel is to be allocated to the corresponding pixel at the same position in the older one of the two original images that are represented by image data 340, 342.

In the simplified block diagram according to FIG. 4, no additional results are considered; instead, only a fusion takes place between the depth image just ascertained (possibly with measurement uncertainties) 472 and the content, represented by transferred fusion data 474, of the fusion memory, which is represented by determination device 464. This content 474 is the result of the fusion for the preceding time steps, which is now first transferred (warped) in block 464 of old pixel coordinates onto the current pixel coordinates because the image scene has changed in the interim, i.e. has essentially shifted pixel-wise, this pixel-wise shifting being known because of the optical flow field that is represented by correspondence data 470. As noted earlier, these shifts need not be whole-number pixel-wise shifts; sub-pixel-wise shifts generally occur as well, so that an interpolation is then optionally used in the warping process.

For this purpose, correspondence data 470 are used as the already available result of the correspondence generation carried out in determination device 460.

The step of warping, carried out in determination device 464 and also known as the step of transferring, can be imagined as an image on a rubber sheet that is distorted by shifting each point of the rubber sheet by the associated flow vector provided by correspondence data 470.

During the warping process, an interpolation is advantageously carried out as well. The reason for this is that the pixel-wise shifting is generally not a whole-number shift but also has decimal place components. The interpolation is therefore advisable if the highest possible accuracy is to be achieved in the fusion carried out in ascertainment device 466.

Once the warping has taken place in determination device 464, the image coordinates of the transferred fusion data 474 are already brought up to date, but not the contents, i.e. the depth values of the transferred fusion data 474. They still relate to the previous point in time.

This is also the intention in this first variant because the new depth values of depth data 472 are also calculated to be compatible therewith, that is to say, are also to be allocated to the previous point in time.

If measurement inaccuracies are part of the operation, then warping is carried out for the measurement inaccuracies as well.

This may be implemented in a similar manner to the warping of the depth values in determination device 464. In this step, it must advantageously be taken into account that the warping itself leads to an increase in the measurement uncertainties. This can be illustrated by the "ageing" of the measurement! The reasons for this are, for example, the uncertainty in the ascertainment of the flow field used for the warping, and possibly the "ageing" of the data because the scene may have changed since the last measurement took place. In the simplest case, the increase in the measurement uncertainties may occur through a constant additive correction of all measurement uncertainties.

Now, the fusion of the depth values, represented by depth data 472 and the transferred fusion data 474, may take place, in which the new measurement 472 and the old (warped) result 474 are brought together. This fusion carried out in ascertainment device 466 takes place pixel by pixel and without additional dependencies on other data. Fusions performed pixel by pixel may thus be carried out in parallel and independently of one another and are quite simple.

Four possible scenarios are to be examined. The first three cases are more or less trivial while the fourth case is the interesting and important case.

In the first case, neither an old nor a new result is available at the respective pixel. Thus, there is also no fused result. In other words, neither depth data 472 nor transferred fusion data 474 contain an allocated depth value for the corresponding pixel. This means that newly ascertained fusion data 476 have no depth value for the corresponding pixel.

In the second case, a new result is available but an old result is not. The new result is adopted as fused result, and its measurement uncertainty as well. In other words, depth data 472 include an allocated depth value for the corresponding pixel but transferred fusion data 474 do not. This means that newly ascertained fusion data 476 include the depth value supplied by depth data 472 for the corresponding pixel.

In the third case, however, an old result but no new result is available. The old result is adopted as fused result, as is its measurement uncertainty (which has since become greater due to ageing). In other words, depth data 472 include no allocated depth value for the corresponding pixel, but transferred fusion data 474 do. This means that newly ascertained fusion data 476 include the depth value for the corresponding pixel, which was supplied by transferred fusion data 474 for the corresponding pixel.

In the fourth case, both an old and a new result are available. First, it is checked whether they are consistent or whether they are contradictory. In the event they contradict, neither of the two results is adopted, or alternatively, the newer one or, as an alternative, the one featuring the lower measurement uncertainty. A contradiction is at hand if both results lie further apart from each other than can be explained by the smaller one of the two measurement uncertainties. In the opposite case (consistent results), the fusion takes place. In so doing, variance-weighted averaging is preferably carried out, which is known to one skilled in the art. The measurement uncertainties are fused as well. In other words, in this fourth case both depth data 472 and transferred fusion data 474 include a depth value allocated to the corresponding pixel. This means that, provided the depth values are consistent with respect to one another, the newly ascertained fusion data 476 include a depth value for the corresponding pixel which results from a fusion, such as averaging, of the depth values that are allocated to the corresponding pixel in depth data 472 and transferred fusion data 474.

Finally, the fused depth values included in fusion data 474 are transferred from the previous point in time to the current point in time, using determination device 464, for example. Of decisive importance here is the ego-motion between these two time steps, which was already estimated with the aid of determination device 460, for instance, and thus is available and may be applied.

This periodic updating of the depth values is particularly easy if the ego-motion is made up of a pure translation (without rotation). Only an additive correction must then be applied, which is the same for all depth values. The term "additive correction" also includes the negative algebraic sign. In forward travel and a camera pointing forward (the most important case), the negative algebraic sign applies.

If the ego-motion also includes a rotation in addition to the translation, then the periodic updating of the depth values requires a rotation in the three-dimensional space. There are various possibilities and simplifications for this that are known to one skilled in the art. The greatest possible simplification results from dispensing with this correction. This may be justified if the angles of rotation are small, which is true in the case of a vehicle that is driving rapidly in the forward direction.

Now, a second variant of the fusion in the pixel grid will be described.

The second variant of the fusion in the pixel grid is characterized by the fact that the depths are calculated in advance in such a way that the depth image that is represented by depth data 472 is present in the coordinates of the more recent one of the two images that are represented by image data 340, 342. This is meant to describe that the depth value of a pixel is to be allocated to the corresponding pixel at the same position in the newer one of the two original images rather than to the original image represented by first image data 340.

Thus, the fusion carried out in ascertainment device 466 is accordingly also carried out in the new coordinates.

To do so, it is necessary to prepare the content to be fused, in the form of fusion data 476, of the fusion memory, which is represented by determination device 464 in FIG. 4, in two steps. The one step is the afore-described warping. The second step is the also previously described transference of the depth values of fusion data 476 from the previous point in time to the current point in time, in the process of which the depth values of the fusion memory are to be transferred. The sequence of the two steps may also be reversed.

The fusion between transferred fusion data 474 and depth data 472 may be carried out after this preparation.

Both variants are comparable in terms of the work effort and the result.

Figure 5:
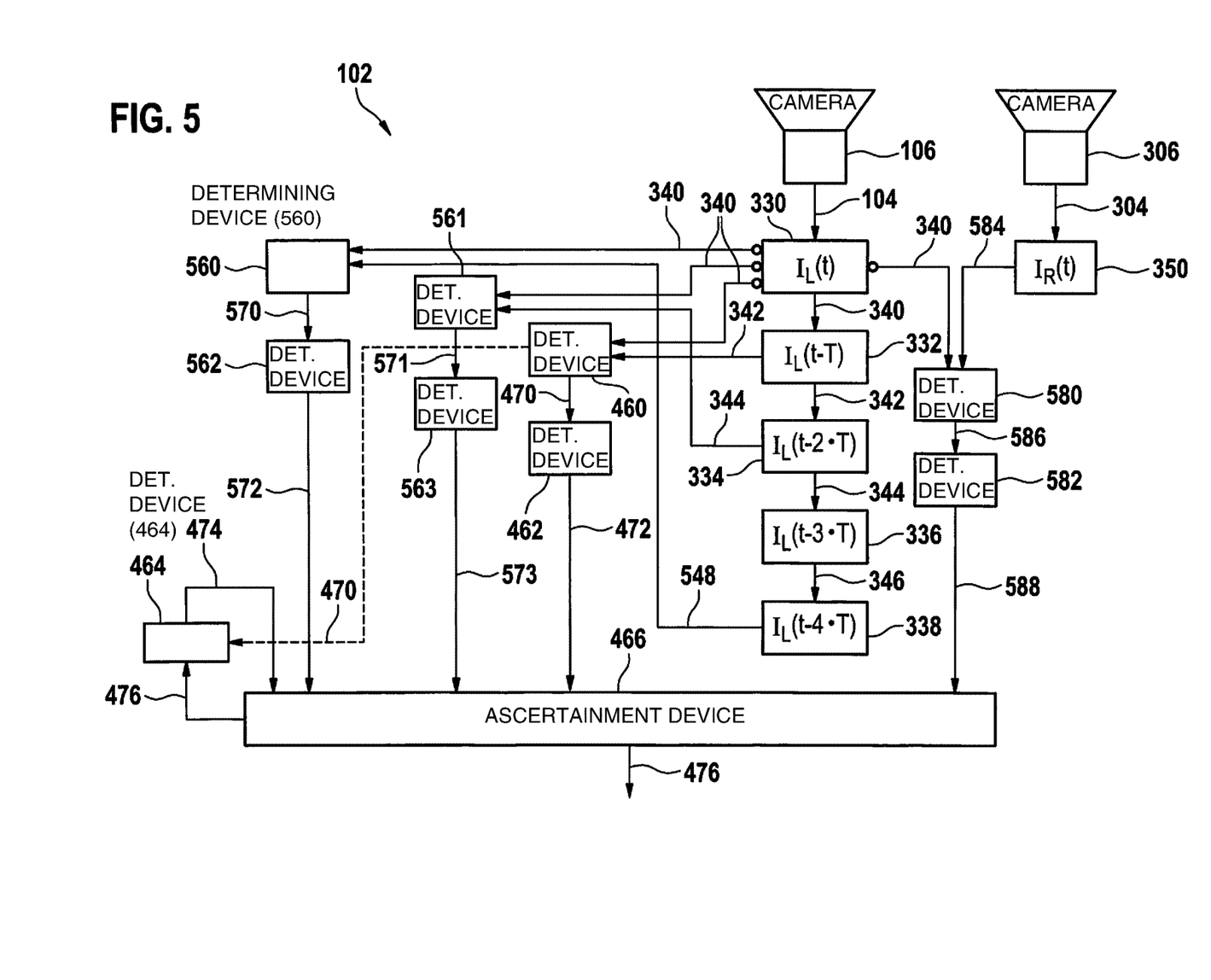
FIG. 5 a block diagram of a device for processing image data according to an exemplary embodiment.

FIG. 5 shows a block diagram of a device 102 for processing image data 104 according to an exemplary embodiment. This may be an exemplary embodiment of the device described with the aid of FIG. 1.

As already described on the basis of FIGS. 3 and 4, device 102 includes memory devices 330, 332, 334, 336, 338, as well as determination devices 460, 462, 464, and ascertainment device 466.

Merely by way of example, device 102 includes two additional determination devices 560, 561, which are implemented in accordance with determination device 460, and two additional determination devices 562, 563, which are developed in accordance with determination device 462.

Determination device 560 is designed to generate a correspondence between first image data 340 and fourth preceding image data 548, as described on the basis of FIG. 4, and to supply correspondence data 570 determined by such a correspondence generation.

Determination device 561 is designed to generate a correspondence between first image data 340 and second preceding image data 344, as described with the aid of FIG. 4, and to provide correspondence data 571 determined by such a correspondence generation.

As described with the aid of FIG. 4, determination device 562 is designed to carry out an ego-motion estimate using correspondence data 570 and to supply depth data 572 on the basis of the ego-motion estimate.

As described with the aid of FIG. 4, determination device 563 is developed to carry out an ego-motion estimate using correspondence data 571, and to supply depth data 573 on the basis of the ego-motion estimate.

According to this exemplary embodiment, ascertainment device 466 is designed to ascertain and supply fusion data 476 using depth data 472, 572, 573 and transferred fusion data 474.

According to this exemplary embodiment, transferred fusion data 474 are supplied by determination device 464, as described with the aid of FIG. 4.

According to an exemplary embodiment, device 102 moreover includes two additional determination devices 580, 582.

Determination device 580 is designed to generate a correspondence between first image data 340, which are based on data provided by first camera 106, and second image data 584, which are based on data provided by second camera 106, and to supply stereo correspondence data 586 determined by such a correspondence generation 580. First image data 340 and second image data 584 represent data acquired at mutually corresponding points in time.

Determination device 582 is developed to carry out a triangulation using stereo correspondence data 586, and to supply stereo depth data 588 that include the depth data and/or a scale on the basis of the triangulation.

According to this exemplary embodiment, ascertainment device 466 is designed to ascertain the fusion data also with the aid of the stereo depth data and/or the scale provided via stereo depth data 588.

Thus, according to this exemplary embodiment, four depth measurements in the form of depth data 472, 572, 573 as well as stereo depth data 588 and a periodically updated earlier result in the form of transferred fusion data 474 are fused with one another. The number of depth measurements as well as image data 340, 342, 344, 548, 584 used for determining the depth measurements have been selected merely by way of example and may be appropriately adapted to the desired application fields of device 102.

The second variant described by FIG. 4 is recommended for the more complex exemplary embodiment shown in FIG. 5, because there is no shared older point in time, but rather a shared newer point in time to which all four new depth-image measurements are related.

The more complex exemplary embodiment shown in FIG. 5 includes the known block diagram from FIG. 3. The block diagram from FIG. 4 is included as well.

The block diagram in FIG. 5 includes a total of four blocks "Corresp", represented by determination devices 460, 560, 561, 580, in which the respective correspondence generation takes place. In the process, the optical flow is determined three times on the left side, i.e. a correspondence is generated in the temporal direction at different time intervals T, 2T, 4T; on the right side, a correspondence generation is carried out once in a time-synchronous manner in the local direction between left camera 106 and right camera 306, for the stereo case.

The "Corresp" blocks are followed by a respective ego-motion determination and a depth determination, represented by determination devices 462, 562, 563. Here, ascertainment device 582 represents a "D&S" block (depth & scale block), which supplies a depth image and, according to an exemplary embodiment, additionally a scale. An ego-motion estimate is generally not required in block 582 because the stereo camera pair is usually mounted in a mechanically fixed relationship to each other. The scale results from the normally known fixed distance between the two cameras 106, 306 (basic width). This scale may directly be reused in the fusion carried out in ascertainment device 466, or it may be fused with a scale from another source, as described earlier.

In contrast to the exemplary embodiment described with the aid of FIG. 4, the fusion block represented by ascertainment device 466 now has four input images instead of one input image. The four input images are represented by image data 340, 342, 344, 548. However, the principle of the fusion remains the same as described above. If a plurality of measurements is available for a pixel, then they are to be fused. Here, too, variance-weighted averaging is preferably carried out for this purpose, which is known to one skilled in the art.

Optionally, this fusion may also take place sequentially in a step-by-step manner, that is to say, a fusion of the first and second measurement, a fusion of the intermediate result with the third measurement, a fusion of the further intermediate result with the fourth measurement, for example.

Here, too, the warping step carried out in determination device 464 preferably uses the result of the correspondence generation between images $I_L(t)$ and $I_L(t-T)$ represented by correspondence data 470.

The described fusion in the pixel grid constitutes a central interface in the system at which the involved sensors, in this case cameras 106, 306, inject their data 104, 304, and that the additional algorithms utilize.

Supplied fusion data 476, for example, may be used by driver-assistance systems or information systems whose demands with regard to range and accuracy are greater. The described unified concept of the basic signal processing may be used for all camera systems (mono, stereo, dual mono, multi-camera).

If an exemplary embodiment includes an "and/or" linkage between a first feature and a second feature, then this means that the exemplary embodiment according to one specific embodiment includes both the first feature and the second feature, and according to another specific embodiment, it includes either only the first feature or only the second feature.

What is claimed is:

1. A method for processing image data, the method comprising:
   determining correspondence data as the result of a correspondence generation between first image data which represent data based on image data recorded by a camera at a first point in time, and preceding image data which represent data based on image data recorded by the camera at a preceding point in time, the first image data representing data that are based on image data recorded by a camera at a first point in time, and the preceding image data representing data that are based on image data recorded by the camera at a preceding point in time;
   determining depth data based on an ego-motion estimate carried out using the correspondence data; and
   ascertaining fusion data with the aid of the depth data and transferred fusion data, the fusion data including an item of depth information based on the image data;
   wherein the fusion data correspond to the depth data in the ascertaining if no transferred fusion data are available, and the fusion data correspond to the transferred fusion data if no depth data are available.

2. The method as recited in claim 1, further comprising:
   ascertaining the transferred fusion data as the result of a transfer of fusion data ascertained in a preceding task ascertaining, and the correspondence data.

3. The method as recited in claim 1, wherein in the determining the correspondence data, flow vectors are determined as the correspondence data, which are allocated to at least one of: i) image points of the first image data, and ii) image points of the preceding image data.

4. The method as recited in claim 1, wherein in the determining of depth data, depth values are ascertained as the depth data, which are allocated to at least one of: i) image points of the first image data, and ii) image points of the preceding image data.

5. The method as recited in claim 1, wherein the fusion data are ascertained in the ascertaining with the aid of a mean value generation between the depth data and the transferred fusion data.

6. The method as recited in claim 1, wherein in the ascertaining the fusion data, a consistency between the depth data and the transferred fusion data is checked.

7. The method as recited in claim 1, further comprising:
   determining additional correspondence data as the result of a correspondence generation between the first image data and additional preceding image data, the preceding image data representing data that are based on image data recorded by the camera at another preceding point in time; and
   determining additional depth data on the basis of an ego-motion estimate carried out using the additional correspondence data;
   wherein the fusion data are furthermore ascertained in the ascertaining with the aid of the additional depth data.

8. A method for processing image data, the method comprising:
   determining correspondence data as the result of a correspondence generation between first image data which represent data based on image data recorded by a camera at a first point in time, and preceding image data which represent data based on image data recorded by the camera at a preceding point in time, the first image data representing data that are based on image data recorded by a camera at a first point in time, and the preceding image data representing data that are based on image data recorded by the camera at a preceding point in time;
   determining depth data based on an ego-motion estimate carried out using the correspondence data;
   ascertaining fusion data with the aid of the depth data and transferred fusion data, the fusion data including an item of depth information based on the image data;
   determining stereo correspondence data as the result of a correspondence generation between the first image data and second image data, the second image data representing data that are based on image data recorded by an additional camera at the first point in time; and
   determining stereo depth data, which represent at least one of depth data and a scale, on the basis of a triangulation carried out using the stereo correspondence data;
   wherein the fusion data are ascertained in the ascertaining using the stereo depth data.

9. The method as recited in claim 1, further comprising:
   at least one of: i) acquiring the image data using at least one camera, and ii) using the fusion data in a driver-assistance system for a vehicle or in a control unit for a mobile robot.

10. A device for processing image data, comprising:
    a determination device to determine correspondence data as the result of a correspondence generation between first image data, which represent data based on image data recorded by a camera at a first point in time, and preceding image data, which represent data based on image data recorded by the camera at a preceding point in time;

a determination device to determine depth data on the basis of an ego-motion estimate carried out using the correspondence data; and an ascertainment device to ascertain fusion data using the depth data and the transferred fusion data, the fusion data including an item of depth information based on the image data;

wherein the fusion data correspond to the depth data in the ascertaining if no transferred fusion data are available, and the fusion data correspond to the transferred fusion data if no depth data are available.

11. A vehicle, comprising:
at least one camera;
a device for processing the image data of the at least one camera; and
a driver-assistance system, which is configured to carry out a driver-assistance function using fusion data made available by the device;
wherein the device for processing the image data includes a first determination device, which is configured to determine correspondence data as the result of a correspondence generation between first image data, which represent data based on image data recorded by a camera at a first point in time, and preceding image data, which represent data based on image data recorded by the camera at a preceding point in time, a second determination device, which is configured to determine depth data on the basis of an ego-motion estimate carried out using the correspondence data, and an ascertainment device, which is configured to ascertain fusion data using the depth data and the transferred fusion data, the fusion data including an item of depth information based on the image data,
wherein the fusion data correspond to the depth data in the ascertaining if no transferred fusion data are available, and the fusion data correspond to the transferred fusion data if no depth data are available.

12. A non-transitory machine-readable memory medium on which is stored a computer program, which is executable by a processor, comprising:
a program code arrangement having program code for processing image data, the computer program, by performing the following:
determining correspondence data as the result of a correspondence generation between first image data which represent data based on image data recorded by a camera at a first point in time, and preceding image data which represent data based on image data recorded by the camera at a preceding point in time, the first image data representing data that are based on image data recorded by a camera at a first point in time, and the preceding image data representing data that are based on image data recorded by the camera at a preceding point in time;
determining depth data based on an ego-motion estimate carried out using the correspondence data; and
ascertaining fusion data with the aid of the depth data and transferred fusion data, the fusion data including an item of depth information based on the image data;
wherein the fusion data correspond to the depth data in the ascertaining if no transferred fusion data are available, and the fusion data correspond to the transferred fusion data if no depth data are available.

* * * * *